(12) United States Patent
Matei et al.

(10) Patent No.: US 11,915,112 B2
(45) Date of Patent: Feb. 27, 2024

(54) METHOD FOR CLASSIFICATION BASED DIAGNOSIS WITH PARTIAL SYSTEM MODEL INFORMATION

(71) Applicant: Palo Alto Research Center Incorporated, Palo Alto, CA (US)

(72) Inventors: Ion Matei, Sunnyvale, CA (US); Johan de Kleer, Los Altos, CA (US); Alexander Feldman, Santa Cruz, CA (US); Maksym Zhenirovskyy, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 1137 days.

(21) Appl. No.: 16/559,069

(22) Filed: Sep. 3, 2019

(65) Prior Publication Data

US 2021/0065065 A1 Mar. 4, 2021

(51) Int. Cl.
| | | |
|---|---|---|
| *G06N 3/12* | (2023.01) | |
| *G06F 17/10* | (2006.01) | |
| *G06F 17/11* | (2006.01) | |
| *G06F 17/16* | (2006.01) | |
| *G06N 3/08* | (2023.01) | |
| *G06N 3/126* | (2023.01) | |
| *G06N 20/20* | (2019.01) | |

(52) U.S. Cl.
CPC ............ *G06N 20/20* (2019.01); *G06F 17/10* (2013.01); *G06F 17/11* (2013.01); *G06F 17/16* (2013.01)

(58) Field of Classification Search
CPC ......... G06N 20/20; G06F 17/10; G06F 17/11; G06F 17/16
See application file for complete search history.

(56) References Cited

U.S. PATENT DOCUMENTS

| | | | | |
|---|---|---|---|---|
| 5,748,847 A | * | 5/1998 | Lo ............................ | G06N 3/08 706/14 |
| 2010/0082513 A1 | * | 4/2010 | Liu ........................ | G06N 3/006 706/46 |

(Continued)

OTHER PUBLICATIONS

M. Abadi, A. Agarwal, P. Barham, E. Brevdo, Z. Chen, C. Citro, G. S. Corrado, A. Davis, J. Dean, M. Devin, S. Ghemawat, I. Goodfellow, A. Harp, G. Irving, M. Isard, Y. Jia, R. Jozefowicz, L. Kaiser, M. Kudlur, J. Levenberg, D. Mane, R. Monga, S. Moore, D. Murray, C. Olah, M. Schuster, J. Shlens, B. Steiner, I. Sutskever, K. Talwar, P. Tucker, V. Vanhoucke, V. Vasudevan, F. Viegas, O. Vinyals, P. Warden, M. Wattenberg, M. Wicke, Y. Yu, and X. Zheng, "TensorFlow: Large-scale machine learning on heterogeneous distributed systems," 2015, software available from tensorflow.org. [Online]. Available:https://www.tensorflow.org/.

(Continued)

*Primary Examiner* — Brandon S Cole
(74) *Attorney, Agent, or Firm* — Lippes Mathias LLP

(57) ABSTRACT

A classification-based diagnosis for detecting and predicting faults in physical system (e.g. an electronic circuit or rail switch) is disclosed. Some embodiments make use of partial system model information (e.g., system topology, components behavior) to simplify the classifier complexity (e.g., reduce the number of parameters). Some embodiments of the method use a Bayesian approach to derive a classifier structure.

17 Claims, 11 Drawing Sheets

(56) References Cited

U.S. PATENT DOCUMENTS

| | | | | |
|---|---|---|---|---|
| 2012/0084859 | A1* | 4/2012 | Radinsky | G06F 21/56 707/E17.046 |
| 2013/0258865 | A1* | 10/2013 | Kovvali | H04W 24/10 370/241 |
| 2017/0147922 | A1* | 5/2017 | Lee | G06N 3/12 |
| 2019/0384255 | A1* | 12/2019 | Krishnaswamy | G05B 23/024 |
| 2020/0042857 | A1* | 2/2020 | Fang | G06N 3/08 |

OTHER PUBLICATIONS

Martin Abadi, Paul Barham, Jianmin Chen, Zhifeng Chen, Andy Davis, Jeffrey Dean, Matthieu Devin, Sanjay Ghemawat, Geoffrey Irving, Michael Isard, Manjunath Kudlur, Josh Levenberg, Rajat Monga, Sherry Moore, Derek G. Murray, Benoit Steiner, Paul Tucker, Vijay Vasudevan, Pete Warden, Martin Wicke, Yuan Yu, and Xiaoqiang Zheng; "TensorFlow: A system for large-scale machine learning", USENIX Association 12th USENIX Symposium on Operating Systems Design and Implementation, pp. 265-283.

S. Ruder, "An overview of gradient descent optimization algorithms," CoRR, vol. abs/1609.04747, 2016. [Online]. Available: http://arxiv.org/abs/1609.04747.

V. Subramanian, Deep Learning with PyTorch: A practical approach to building neural network models using PyTorch, 1st ed. Packt Publishing, 2018.

T. Blochwitz, M. Otter, M. Arnold, C. Bausch, C. Clauß, H. Elmqvist, A. Junghanns, J. Mauss, M. Monteiro, T. Neidhold, D. Neumerkel, H. Olsson, J .-V. Peetz, S. Wolf; "The Functional Mockup Interface for Tool independent Exchange of Simulation Models", Proceedings 8th Modelica Conference, Dresden, Germany, Mar. 20-22, 2011.

Dougal Maclaurin, David Duvenaud, and Matthew Johnson; Autograd tutorial, https://github.com/HIPS/autograd/blob/master/docs/tutorial.md, Jul. 18, 2019.

Dragan D. Nikolic; "DAE Tools: equation-based object-oriented modelling, simulation and optimisation software", PeerJ Comput. Sci. 2:e54; DOI 10.7717/peerj-cs.54, Apr. 2016.

M. S. Arulampalam, S. Maskell, and N. Gordon, "A tutorial on particle filters for online nonlinear/non-gaussian bayesian tracking," IEEE Transactions on Signal Processing, vol. 50, pp. 174-188, 2002.

J. de Kleer, A. Mackworth, and R. Reiter, "Characterizing diagnoses and systems," "Journal of Artificial Inteligence", vol. 56, No. 2-3, pp. 197-222, 1992.

J. Gertler, Fault-Detection and Diagnosis in Engineering Systems. New York: Marcel Dekker, 1998.

R. Isermann, "Model-based fault-detection and diagnosis—status and applications," Annual Reviews in Control, vol. 29, No. 1, pp. 71-85, 2005.

R. Kalman, "A new approach to linear filtering and prediction problems," Transactions of the ASME—Journal of Basic Engineering, vol. 82, No. Series D, pp. 35-45, 1960.

D. P. Kingma and J. Ba, "Adam: A method for stochastic optimization," CoRR, vol. abs/1412.6980, 2014. [Online]. Available: http://arxiv.org/abs/1412.6980

I. Matei, J. de Kleer, and R. Minhas, "Learning constitutive equations of physical components with constraints discovery," in Proceedings of the IEEE 2018 American Control Conference (ACC 2018), Jun. 2018.

I. Matei, A. Ganguli, T. Honda, and J. de Kleer, "The case for a hybrid approach to diagnosis: A railway switch," in Proceedings of the 26th International Workshop on Principles of Diagnosis (DX-2015), Aug. 2015, pp. 225-232.

C. C. Pantelides, "The consistent initialization of differential-algebraic systems," SIAM Journal on Scientific and Statistical Computing, vol. 9, No. 2, pp. 213-231, 1988. [Online]. Available: https://doi.org/10.1137/0909014.

R. J. Patton, P. M. Frank, and R. N. Clark, Issues of Fault Diagnosis for Dynamic Systems. Springer-Verlag London, 2000.

\* cited by examiner

METHOD FOR CLASSIFICATION BASED DIAGNOSIS WITH PARTIAL SYSTEM MODEL INFORMATION

BACKGROUND

The following relates generally to fault diagnosis.

Current diagnosis algorithms either use model-based approaches or machine-learning based approaches. Current model-based approaches require the full system model which is not always available. Current machine-learning based approaches disregard any information about the system that generated the training data. This can lead to a highly complex model for the classifier.

The approaches described herein overcome these drawbacks.

BRIEF DESCRIPTION

Embodiments described herein teach a classification-based diagnosis for detecting and predicting faults in physical system. The approaches described herein make use of partial system model information (e.g., system topology, components behavior) to simplify the classifier complexity (e.g., reduce the number of parameters). Some embodiments use a Bayesian approach to derive a classifier structure. Training the classifier relies on learning parameters of unknown components.

Some embodiments are based on the assumption of knowing the system topology and the behavior of some of the components. The system operates a number of modes that correspond to the nominal and fault operating modes. First, a causal representation of the physical system model is obtained. This provides information as to what component maps must be modeled, and what the inputs and outputs of these maps are. Next, models for the maps are chosen with parameters that need to be learned. A Bayesian approach is used to derive a structure for the classifier. Unlike a typical machine-learning classifier, the parameters used in the embodiments described herein that are trained have a physical meaning: they are the parameters of an unknown component(s). The classifier uses an in-built state estimation based on model simulation. This is imperative for the classifier representation. In this regard, the detailed description will describe two example algorithms for the classifier training. In the first algorithm, a number of regression problems are first solved that train the parameters of the first block of the classifier. The results of this training step are further used to compute (in part) the parameters of the second classifier block. In the second algorithm, under the assumption of a known measurement noise, approaches simultaneously learn the parameters of the maps of the unknown components and the mode prior probability. Learning the map parameters and the mode prior probability is equivalent to learning the classifier parameters.

According to aspects illustrated herein, there is provided a device comprising: at least one processor; and at least one memory including computer program code; the at least one memory and the computer program code may be configured to, with the at least one processor, cause the device to: during an offline learning phase, learn parameters of an unknown component; and during an online learning phase, predict a current mode based on the learned parameters of the unknown component.

In the device as described in the preceding paragraph, the offline learning phase and the online learning phase may occur at least partially simultaneously. The at least one memory and the computer program code may be further configured to, with the at least one processor, cause the device at least to: learn the parameters of the unknown component by solving an optimization problem. The at least one memory and the computer program code may be further configured to, with the at least one processor, cause the device at least to: learn the parameters of the unknown component by solving: $\beta_j^* = \arg\min \Sigma_i \|y_{0:T}^{(i)} - \hat{y}_{0:T}^{(i)}\|^2$ where $\beta$ is the vector of parameters, j is a possible mode, and $y_{0:T}$ is an output of a system that includes the unknown component. The at least one memory and the computer program code may be further configured to, with the at least one processor, cause the device at least to: during the offline learning phase, estimate a switching parameter; and during the online learning phase, predict the current mode further based on the switching parameter. The at least one memory and the computer program code may be further configured to, with the at least one processor, cause the device at least to: during the offline learning phase: estimate an error covariance matrix; and estimate a switching parameter based on an argmin function and the estimated covariance matrix; and during the online learning phase, predict the current mode further based on the switching parameter. The at least one memory and the computer program code may be further configured to, with the at least one processor, cause the device at least to: during the online learning phase, predict the current mode according to an argmax function, wherein an input of the argmax function is the learned parameters. The at least one memory and the computer program code may be further configured to, with the at least one processor, cause the device at least to: during the online learning phase, predict the current mode by solving:

$$j^* = \arg\max_j p(\theta = j \mid y_{0:T}; \beta_j^*, \eta^*)$$

where $\beta$ is the vector of parameters, j is a possible mode, $\theta$ is a random variable, n is a switching parameter, and $y_{0:T}$ is an output of a system that includes the unknown component.

In another aspect, there is a method comprising: during an offline learning phase, learn parameters of an unknown component; and during an online learning phase, predict a current mode based on the learned parameters of the unknown component.

One advantage of the approaches described herein is the reduction in the number of parameters that need to be learned by introducing partial information about the system model. In turn, this simplifies the learning process by reducing the training time and the number of training examples. In addition, the parameters learned have a physical meaning because they are the parameters of a map that correspond to a physical component.

Another advantage is that classifier training is speed up by using partial information of physical system.

Variations of the present techniques include use of filtering-based techniques to solve the regression problems that are part of the classifier training.

DETAILED DESCRIPTION

Figure 1:
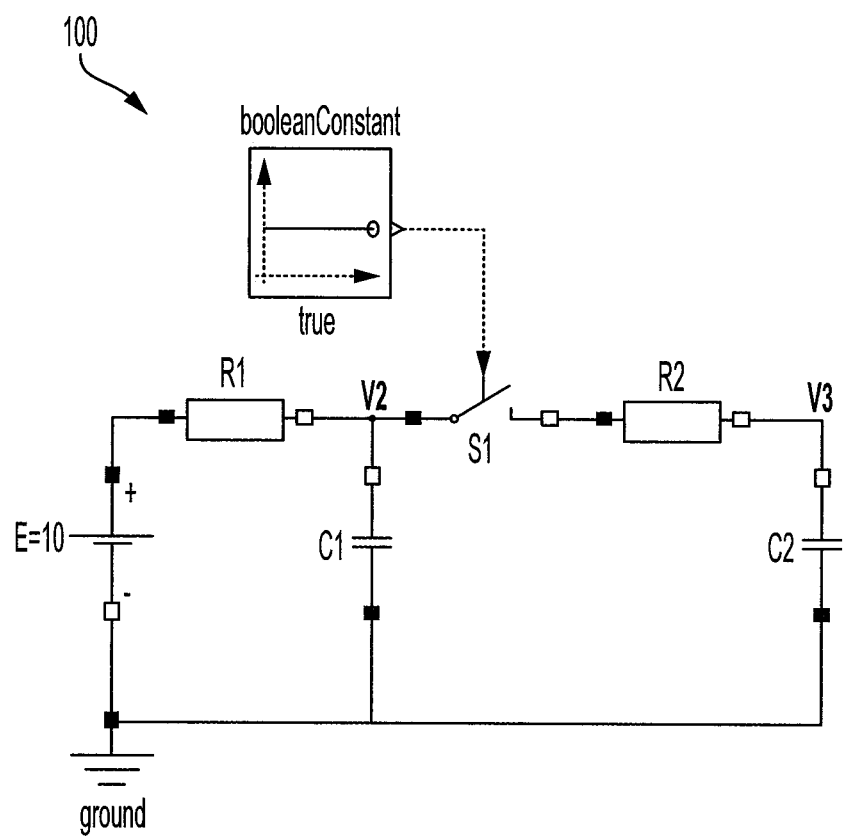
FIG. 1 shows an example of a physical system with a hybrid DAE.

Machine learning methods based on classifiers are more robust to system complexity, but they ignore the relations that exist in the data due to the physical laws governing the behavior of the system. The approaches described herein integrate (partial) knowledge about the physical system in the machine learning process. Some embodiments focus on classification-based diagnosis. This disclosure will describe how the partially known model is integrated in the classification algorithm, and how the new algorithm differs from a machine learning classifier based on neural networks. Also demonstrated is that by integrating the partial system knowledge, the cross-entropy optimization problem used for learning a classifier can be expressed as a set of regression problems in terms of the parameters of the model representing the unknown behavior, followed by a simpler classifier learning.

1. INTRODUCTION

Machine learning algorithms are a useful tool for system analytics applications such as diagnosis and prognostics. They are robust to system complexity but agnostic to the source of the training data. In addition, they typically require more complex models (e.g., neural networks (NN)) with many layers. In many applications, at least some partial knowledge about the system from which the training data originates is available. Indeed, several previous commercial projects encountered exactly this case: access was available to the specifications of only a subset of the system components due to proprietary reasons (Matei, I., Ganguli, A., Honda, T., & de Kleer, J. (2015, August). The case for a hybrid approach to diagnosis: A railway switch. *In Proceedings of the 26th international workshop on principles of diagnosis* (dx-2015) (pp. 225-232)). If full information about the system is available, a plethora of model-based methods for diagnosis and prognostics can be used (de Kleer, J., Mackworth, A., & Reiter, R. (1992). Characterizing diagnoses and systems. "*Journal of Artificial Inteligence*", 56(2-3), 197-222.), (Gertler, J. (1998). *Fault-detection and diagnosis in engineering systems*. New York: Marcel Dekker.), (Isermann, R. (2005). Model-based fault-detection and diagnosis-status and applications. *Annual Reviews in Control*, 29(1), 71-85.), (Patton, R. J., Frank, P. M., & Clark, R. N. (2000). *Issues of fault diagnosis for dynamic systems*. Springer-Verlag London). Some methods that require some prior information about the fault rates do not always scale with the system complexity although they work well for particular classes of systems. For example, Kalman filter-based methods (Kalman, R. (1960). A new approach to linear filtering and prediction problems. Transactions of the *ASME-Journal of Basic Engineering*, 82(Series D), 35-45) are optimal for linear systems with Gaussian noise. Machine learning methods based on classifiers are more robust to system complexity, but they ignore the relations that exist in the data due to the physical laws governing the behavior of the system.

The following discusses how (partial) knowledge about the system can be integrated in the classifier learning process. The discussion focuses on classification problems as they are suitable for diagnosis purposes. Two main challenges are addressed: (i) representation and integration of the unknown behavior, and (ii) design of a training algorithm that considers the partial system knowledge. To address these challenges, some previous work on learning acausal components in partially known physical systems (Matei, I., de Kleer, J., & Minhas, R. (2018, June). Learning constitutive equations of physical components with constraints discovery. *In Proceedings of the ieee* 2018 *american control conference* (acc 2018)) is built upon. Unlike causal systems, acausal systems do not have a fixed notion of inputs and outputs. They are characterized by ports through which energy is exchanged between components.

Component behaviors are described by constitutive equations in terms of port and internal variables. The system behavior emerges from the composition of individual component behaviors through port connections. Acausal systems are typically represented as differential algebraic equations (DAEs). Under certain conditions, by employing index reduction techniques, they can be transformed into ordinary differential equations (ODEs) and solved using standard ODE solvers.

Some embodiments address the first challenge (i) by bringing the system of equations into a block-lower-triangular (BLT) form. This form describes the causal relations between component variables: the equations from which variables are computed, and what variables need to be computed first in order to compute other variables. Hence, some approaches derive an input-output representation (e.g., a regression model, or a recurrent NN) to represent the unknown behavior, and more importantly this representation can be composed with the rest of the known components. The second challenge (ii) is addressed by showing that a cross-entropy optimization problem used for learning a classifier can be expressed as a set of regression problems in terms of the parameters of the model representing the unknown behavior, followed by a simpler classifier learning. Some embodiments amount to deriving a formal approach to integrating partial system knowledge in classification-based diagnosis.

2. PROBLEM SETUP

One objective is to diagnose faults in a physical system. The nominal and the fault behaviors represent different operation modes. In this regard, diagnosing a fault means to identify an operation mode.

2.1. Model Representation

Some embodiments assume that the behavior of the physical system is described by a hybrid differential algebraic equation (DAE). The typical mathematical model for describing the behavior of the system is $$0 = F(\dot{x}, x, u, w, \theta) \quad (1)$$

$$y = h(x, u, v, \theta) \quad (2)$$

where x is the state vector, u is the vector of inputs, and w and v are process and measurement noise, respectively. The system output is denoted by y and θ is a variable that sets the mode of operation and takes values in the discrete set $\{1, 2, \ldots, M\}$. It is sometimes more beneficial to work with discrete dynamics of the form $$0 = F(x_{k+1}, x_k, u_k, w_k, \theta_k) \quad (3)$$

$$y_k = h(x_k, u_k, v_k, \theta_k) \quad (4)$$

which can be obtained through approximations of the continuous dynamics, e.g., by approximating the state derivatives.

An example of an electric circuit whose behavior is described by a hybrid DAE is shown in FIG. 1. As will be seen, FIG. 1 shows an example of a physical system with a hybrid DAE. The circuit 100 has two modes of operations that are activated by manipulating an electric switch S1. In the nominal mode the switch S1 is closed. An open switch models an open connection for the resistor R2. In the nominal mode, the behavior of the system is given by $$u_{R_1} = E + v_2$$

$$i_E = -\frac{1}{R_1} u_{R_1}$$

$$u_{R_2} = v_3 - v_2$$

$$i_{C_2} = \frac{1}{R_2} u_{R_2}$$

$$i_{C_1} = i_E - i_{C_2}$$

$$\frac{d}{dt} v_2 = \frac{1}{C_1} i_{C_1}$$

$$\frac{d}{dt} v_3 = \frac{1}{C_2} i_{C_2}$$

while in the fault mode there is $$u_{R_1} = E + v_2$$

$$i_{C_1} = -\frac{1}{R_1} u_{R_1}$$

$$\frac{d}{dt} v_2 = \frac{1}{C_1} i_{C_1}$$

Note that the two set of equations describe two DAEs. However, by simple substitutions they can be converted into ODEs. For example, the fault mode equation takes the form $$\frac{d}{dt} v_2 = -\frac{1}{R_1 C_1} v_2 - \frac{1}{R_1 C_1} E$$

It is often preferred to preserve the algebraic equations as they can give us key insights into the behavior of specific components.

2.2. Partially Known Behavior

In an ideal case, both the topological and behavioral representation of the system are known. In real scenarios, however, this is rarely the case as has been previously discovered (Matei, I., Ganguli, A., Honda, T., & de Kleer, J. (2015, August). The case for a hybrid approach to diagnosis: A railway switch. In *Proceedings of the 26th international workshop on principles of diagnosis* (dx-2015) (pp. 225-232)). One common cause for lacking full system description is incomplete technical specifications: often, even the system manufacturers do not have access to the complete list of component specifications due to proprietary reasons. In the context of the embodiments described herein, partial knowledge refers to having access to the behavioral description of a subset of the system components.

Figure 2:
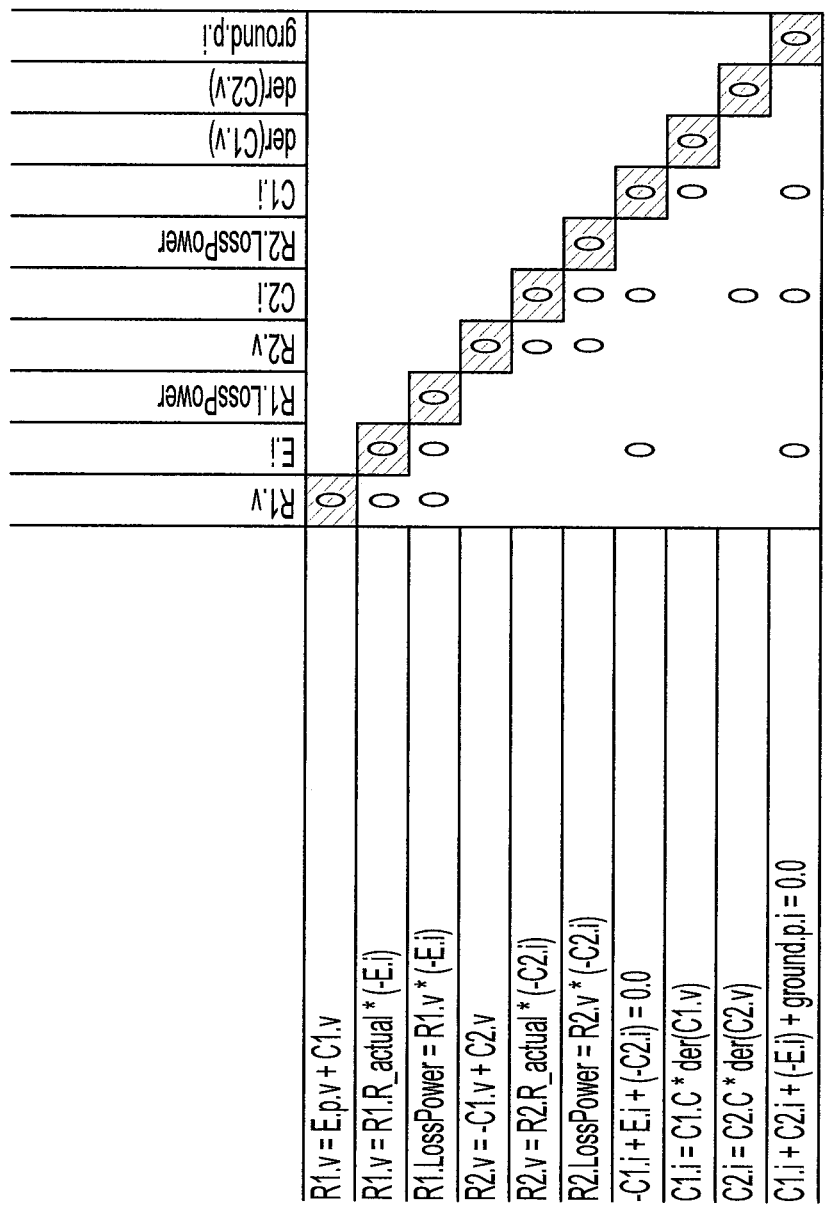
FIG. 2 shows a block-lower-triangular (BLT) form of the circuit shown in FIG. 1. The columns show model variables and the row depict the equations from which the variables are computed. The equations and variables are expressed in the Modelica language.

Some embodiments assume that the topological description of the system is known. To make it more concrete, let the behavior of resistor R2 be unknown. How to choose acausal mathematical component models was discussed in (Matei, I., de Kleer, J., & Minhas, R. (2018, June). Learning constitutive equations of physical components with constraints discovery. In *Proceedings of the IEEE* 2018 *American Control Conference* (acc 2018)). The component model must contain two connectors, each connector having a current and a potential variable. For the example of FIG. 1, these are $v_2$, $i_2$, $v_3$ and $i_3$, where the indices refer to the nodes 2 (marked V2) and 3 (marked V3). $i_2$ is the current through resistor R2. These variables are constrained by a vector valued function $f_{R_2}: \mathbb{R}^4 \rightarrow \mathbb{R}^2$, such that $f_{R_2}(v_2, i_2, v_3, i_3; \beta) = 0$, where β is a set of unknown model parameters. To simplify the model, some embodiments assume that $i_2 + i_3 = 0$. Therefore, these embodiments are left with finding a function $f'_{R_2}: \mathbb{R}^3 \rightarrow \mathbb{R}$ such that $f'_{R_2}(v_2, i_2, v_3; \beta) = 0$. This is not a causal representation. Some embodiments further obtain a causal representation by leveraging the BLT form of the circuit shown in FIG. 2, where these embodiments assume some mockup constitutive equation for R2 for the purpose of performing the transform. The BLT form shows that the capacitor's potentials can be interpreted as inputs for the resistor model and the current is an output. This input-output mapping is particular to this circuit though. Therefore, the causal representation for the behavior of the circuit can be selected as $i_2 = f''_{R_2}(v_2, v_3; \beta)$. There is no systematic way to select a particular representation. Some embodiments select a polynomial or a NN representation. The causal block representation has the advantage that enables us to model the behavior of the unknown component using an input-output map (or an ODE with inputs and outputs). This map is parameterized by and the parameters are learned using training data. It has one important disadvantage though. The causal model for the unknown component is not necessarily generalizable. The reason is that the behavior of the component is not actually causal. In other configurations, the component may have a different causal representation, that is, the current may act as input and the potentials as outputs. There is an additional challenge caused by the parameters of the map. Not all of them are feasible. For example, the resistance value is always positive. A negative value will result in an unstable system. Feasibility constraints can also be learned as discussed in (Matei, I., de Kleer, J., & Minhas, R. (2018, June). Learning constitutive equations of physical components with constraints discovery. In *Proceedings of the IEEE* 2018 *American Control Conference* (acc 2018)) or derived from component properties such as dissipativity.

The dissipativity constraint for component R2 requires the power $P=i_2v_2+i_3v_3 \geq 0$. For a resistor model, this means that $P=i_2(v_2-v_3)=R_2i_2^2$. This shows that the requirement of $R_2 \geq 0$). Alternatively, some embodiments just ignore the existence of constraints and perform unconstrained optimization due to the expectation of the cost function to increase significantly for unstable cases.

2.3. Classification Problem

In the classification problem, the objective is to determine the mode $\theta$ based on a set of observations. Without loss of generality, it is assumed that system has no exogenous inputs.

The type of observations some embodiments consider are time series of output measurements $y_{0:T}=\{y_0, y_1, y_T\}$, where $y_k=y(t_k)$ and $t_k$ are sampling instants, assumed uniform. To simplify the notation, some embodiments will generically denote a sequence $y_{0:T}$ by y. Some embodiments will distinguish between time series sample by using the index i, that is $y^{(i)}$. Some embodiments will make the following assumption.

Assumption 2.1: The mode does not change for the duration [0;T] and all time series correspond to the same initial condition.

This assumption means that each data sequence $y^{(i)}$ corresponds to one mode only. The classification problem involves determining the current mode of operation based on a set of observation y. It is based on a probabilistic model $p(\theta=n|Y=y; \beta)$, where Y is a vector-valued random variable representing the observations (feature vector). The vector $\beta$ represents the parameters corresponding to the model used for describing the conditional probability distribution. For example, some embodiments use a NN model with a softmax function at the last layer. The classification decision is the solution of the problem $\arg\max_j\{p(\theta=j|Y=y)\}$. The parameters $\beta$ are learned by minimizing the cross-entropy between two probability distributions $$\min_{\beta} E[H(q(\theta|Y), p(\theta|Y; \beta))] \quad (5)$$

where H is the cross entropy defined as $H(q,p)=-E_q[\log(p)]$, and the probability distribution $q(\theta|Y)$ is the "ground truth", assumed known. To evaluate the expectation (5) the unknown distribution of Y is needed. This distribution is approximated using the training examples, resulting in $$E[H(q(\theta|Y), p(\theta|Y; \beta))] \approx \frac{1}{N}\sum_{i=1}^{N} H(q(\theta|Y=y^{(i)}), p(\theta|Y=y^{(i)}; \beta)),$$

where $\{y^{(i)}\}_{i=1}^{N}$ is a set of realizations of Y (training examples). The cross-entropy can be explicitly written as $$H(q(\theta|y^{(i)}), p(\theta|y^{(i)}; \beta)) = -\sum_{j=1}^{M} q(\theta=j|Y=y^{(i)}) \log p(\theta=j|Y=y^{(i)})$$

where $q(\theta=j|Y=y^{(i)})=1$ if $y^{(i)}$ corresponds to mode j, and zero otherwise. In the machine learning community, the solution of (5) is typically obtained by using gradient descent algorithms, e.g., stochastic gradient descent, Adams (Kingma, D. P., & Ba, J. (2014). Adam: A method for stochastic optimization. CoRR, abs/1412.6980. Retrieved from http://arxiv.org/abs/1412.6980) or RMSProp (Ruder, S. (2016). An overview of gradient descent optimization algorithms. CoRR, abs/1609.04747. Retrieved from http://arxiv.org/abs/1609.04747). The learning algorithm does not use any information about the origin of the data, or what information may be known about the system that generated it. One immediate consequence is that some embodiments may require a complex model for $p(\theta|Y;\beta)$, and hence a large number of parameters to learn. This in turn induces the need for large training data sets. Another consequence is that some embodiments ignore relations that exist between the elements of the feature vectors. Such relations originate from the physical laws governing the behavior of the physical system.

3. CLASSIFIER TRAINING THAT INCLUDES INFORMATION ABOUT THE SYSTEM

Some embodiments distinguish two cases concerning what is known about the system generating the observations: (i) complete knowledge, and (ii) partial knowledge.

3.1. Complete Knowledge

In this scenario, a complete model of the physical system is available. This model accurately describes the behavior of the system up to some process and measurement noises. The objective is to find a representation of the probability $p(\theta|Y)$. Using Bayes's rule, this probability can be expressed as $$p(\theta=j|Y=y) = \frac{p(y|\theta=j)p(\theta=j)}{\sum_{l=1}^{M} p(y|\theta=l)p(\theta=l)} \quad (6)$$

The computation of the probability $p(\theta=j|Y=y)$ can be done using the model of the system. Using the discrete dynamics (3)-(4), there is $p(y_{0:T}|\theta=j)=$ $\int p(y_T|x_T, \theta=j)p(x_T|y_{0:T-1}, \theta=j)dx_T.$ The probability $p(y_T|x_T, \theta=j)$ is completely determined by the sensing model (4) and the distribution of the measurement noise $v_T$. In the case $v_T$ is an additive Gaussian noise, $p(y_T|x_T, \theta=j)$ is a Gaussian probability distribution function (pdf). The quantity $p(x_T|y_{0:T-1}, \theta=j)$ is the prediction step in the state estimation procedure. It can be expressed in terms of the update step:

$p(x_T|y_{0:T-1}, \theta=j)=$ $\int p(x_T|x_{T-1}, \theta=j)p(x_{T-1}|y_{0:T-1}, \theta=j)dx_{T-1}.$ The probability $p(x_T|x_{T-1}, \theta=j)$ is determined by the process model (3) and by the distribution of the process noise $w_{T-1}$. The probability $p(x_{T-1}|y_{0:T-1}, \theta=j)$ is the update step in the state estimation process. Therefore, some embodiments require M state estimation filters run in parallel for each mode of operation. The complexity of evaluating the iterative convolution operations involving the probabilities at the prediction and update steps depend on the type of model. For linear systems with Gaussian noise these, probabilities are Gaussian with statistics computed using the Kalman filter (Kalman, R. (1960). A new approach to linear filtering and prediction problems. *Transactions of the ASME-Journal of Basic Engineering*, 82(Series D), 35-45.) equations. For nonlinear systems, extensions of the Kalman filter such as the extended or unscented Kalman filter may be an option. Alternatively, provided sufficient computational resources are made available, some embodiments can use the particle filter (Arulampalam, M. S., Maskell, S., & Gordon, N. (2002). A tutorial on particle filters for online nonlinear/nongaussian bayesian tracking. *IEEE TRANSACTIONS ON SIGNAL PROCESSING*, 50, 174-188). If unknown, the probability $p(\theta=j)$ can compute as proxy using the training examples. Namely, there is $$p(\theta = j) \approx \frac{1}{N}\Sigma_{i=1}^{N} q(\theta = j | y^{(i)}).$$

Alternatively, some embodiments can solve an optimization problem of the form (5) with respect to the probabilities $p(\theta=j)$. Some embodiments can model these probability using a softmax function, $$p(\theta = j) = \frac{e^{\eta_j}}{\Sigma_{l=1}^{M} e^{\eta_l}},$$

and solve the optimization problem with respect to parameters $\eta_j$.

Figure 3A:
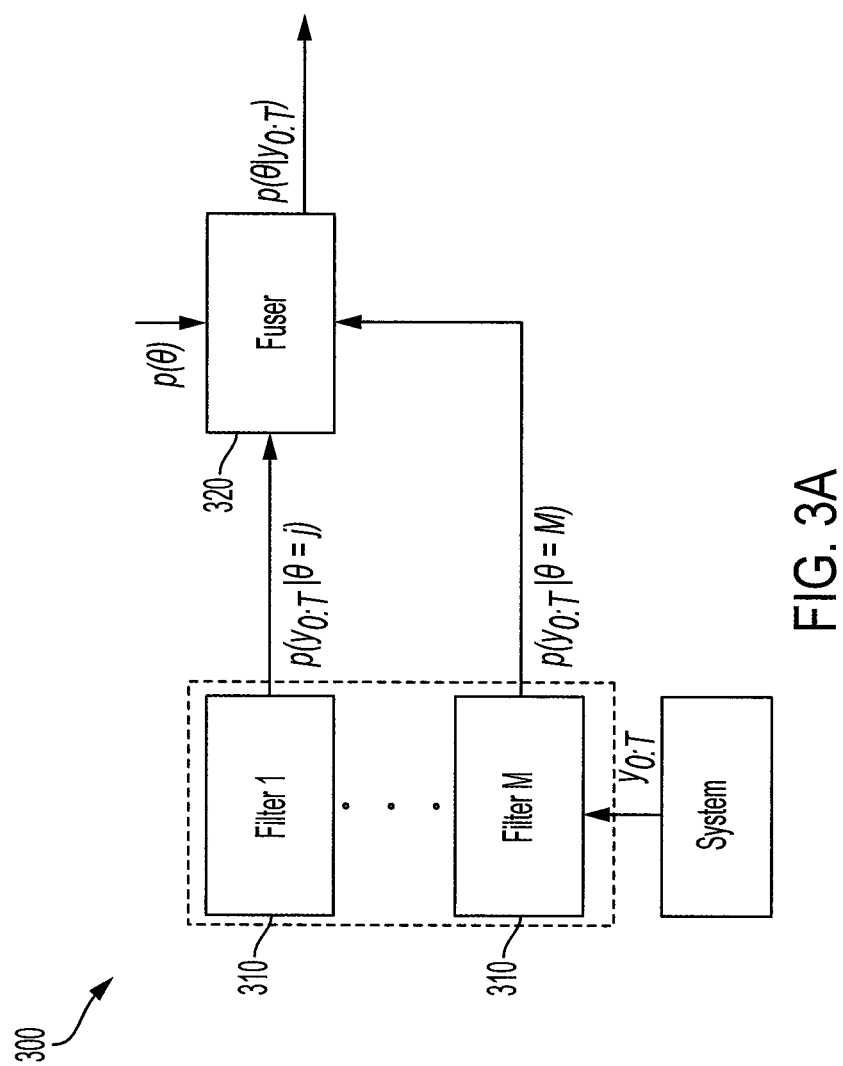
FIG. 3A depicts the architecture of the classifier when the complete model of the system is known.

FIG. 3A depicts the architecture of the classifier 300 when the complete model of the system is known. With reference thereto, M filters 310 compute the probability distribution of the outputs $y_{0:T}$ given a mode of operation, followed by a fusion block 320, which determines the current model by computing the probability introduced in (6).

Figure 3B:
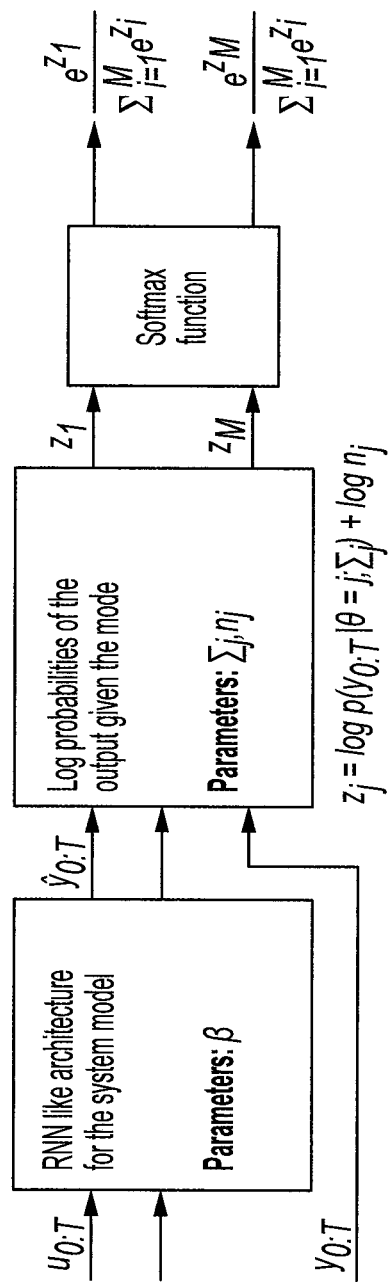
FIG. 3B illustrates that the architecture in some embodiments can be put in a typical machine learning classifier.

FIG. 3B illustrates that the architecture in some embodiments can be further put in a typical machine learning classifier. FIG. 3B considers the case where there are exogeneous inputs as well, denoted by $u_{0:T}$.

3.2. Partial Knowledge

In the partial model knowledge case, the classification problem uses the same formula as in (6), and hence it is needed to evaluate the probabilities $p(y|\theta=j)$ and $p(\theta=j)$ if unknown. To evaluate $p(y|\theta=j)$ the complete model is needed, which at this point is not available because the parameterized maps modeling the unknown components are not tuned to match the observed behavior. One alternative is to augment the state of the system with the parameters of the unknown components and learn them as part of the state estimation problems. Some embodiments would need to use a filter that is accurate enough for non-linear systems since the parameters may enter non-linearly in the behavioral equations. Another approach is to use an optimization based approach for learning the parameters. This fits more naturally with learning classifiers in machine learning approaches. Some embodiments consider two strategies for learning the parameters of the unknown components and switching model. In the first strategy, some embodiments first learn separately the parameters of the unknown part of the system, followed by learning the switching model $p(y|=j)$. In the second strategy, some embodiments jointly learn the unknown component parameters and the switching parameters. To further explain the switching parameters, the modes behave according to some probability distribution, and some embodiments learn a model for this distribution that is parameterized, which shows the switching parameters. The application of one or the other depends on particular assumptions that are made. For both strategies, some embodiments model the probability distribution $p(y_{0:T}|\theta=j)$ as a Gaussian multivariate distribution with unknown covariance matrix. Assuming independent, additive measurement noise, it is formally expressed as $$p(y | \theta = j, \beta_j) \approx p(y | \hat{y}, \theta = j, \beta_j) = \prod_{i=n}^{m} p(\hat{y}_i + v_i | \theta = j, \beta_j),$$

where $p(y_i|\theta_j, \hat{y}_j, \beta_j = p(\hat{y}_j + v_i | \theta_j; \beta_j \sim N(\hat{y}_i, \Sigma_j)$, $\Sigma_j$ is the noise covariance matrix, and $\hat{y}_i$ is an entry in the simulated output sequence $\hat{y}_{0:T}$ using the model in mode j; model that dependents on the unknown vector of parameters $\beta_j$. If the parameters of the component are mode independent, some embodiments can use the same parameters for each mode.

3.2.1. Sequential Parameter Learning

Some embodiments make the assumption that the process noise is negligible, and that the variance of the measurement noise is unknown. The variance will be estimated as part of the learning process. For each mode j, the parameters $\beta_j$ are learned by solving a minimum least square error problem of the form $$\min_{\beta_j} \frac{1}{N_j} \sum_{i=1}^{N_j} \| y_{0:T}^{(i)} - \hat{y}_{0:T}^{(i)}(\beta_j) \|^2,$$

where index i refers to a training example, and $N_j$ is the number of training examples corresponding to mode j. Any non-linear least square optimization algorithm can be used, the numerical complexity coming from the fact that the optimization algorithm requires simulating the model at each iteration and computing the gradient of the cost function, if a gradient-based algorithm is used. To obtain analytic formulas for the gradient of the cost function, some embodiments can use the autodifferentiation feature of deep learning platforms such as Tensorflow (Abadi, M., Agarwal, A., Barham, P., Brevdo, E., Chen, Z., Citro, C., . . . Zheng, X. (2015). *TensorFlow: Largescale machine learning on heterogeneous systems*. Retrieved from https://www.tensorflow.org/(Software available from tensorflow.org)), Pytorch (Subramanian, V. (2018). *Deep learning with pytorch: A practical approach to building neural network models using pytorch* (1st ed.). Packt Publishing.), or Autograd (Maclaurin, D., Duvenaud, D., Johnson, M., & Adams, R. P. (2015). Autograd: *Reverse-mode differentiation of native Python*. Retrieved from http://github.com/HIPS/autograd). All three option support loss functions that can depend on ODE solutions. They do not support DAEs though for which a causal graph representation of the gradient computation scheme is not suitable. An alternative to automatic differentiation is using DAE solvers that support sensitivity analysis (e.g., CVODES, IDAS). An example of a Python package that implements DAE solvers featuring sensitivity analysis is DAETools (Nikolic, D. D. (2016a, April). Dae tools: equation-based object-oriented modelling, simulation and optimisation software. *PeerJ Computer Science*, 2, e54. Retrieved from https://doi.org/10.7717/peerj-cs.54 doi: 10.7717/peerj-cs.54), where sensitivities of the DAE variables with respect to the system parameters can be computed numerically, but accurately at the same time with the DAE solution. Formulating the system dynamics in a deeplearning framework enables the use of GPUs that can prove beneficial for large scale problems and for large training data sets. Once the optimization problem is executed, some embodiments use the empirical covariance as an approximation for j, namely $$\Sigma_j \approx \frac{1}{N_j(T+1)} \sum_{i=1}^{N_j} \sum_{l=0}^{T} [y_l^{(i)} - \hat{y}_l^{(i)}][y_l^{(i)} - \hat{y}_l^{(i)}]',$$

where $\hat{y}_l^{(i)}$ are functions of $\beta^*_j$ (in other words, $\hat{y}_l^{(i)}$ is the output of the model, i.e., the simulated output), the optimal parameters as produced by the optimization problem. Next, some embodiments compute the probabilities $p(\theta=j;\eta)$. For this part some embodiments follow the same idea as in Section 3.1, where an optimization problem as in (5) is solved, in terms of a parameterized model $p(\theta=j;\eta)$. The sequential learning algorithm is summarized in Algorithm 1. One drawback of this approach is that any errors accumulated while learning parameters $\beta_j$ will affect the mode switching part of the algorithm. Some embodiments address this in the second strategy.

3.2.2. Joint Parameter Learning

Here some embodiments assume that the variance of the measurement noise $\Sigma_j$ is known and hence does not need to be estimated. This is the case when the precision of the sensors is available. Some embodiments maintain the same assumptions on the sensing model that induces a Gaussian distribution for the random vector $y_{0:T}|\theta=j$. This way some embodiments can formulate an optimization problem where both the parameters of the unknown components and the switching parameters can be estimated simultaneously. This classification approach is summarized in Algorithm 2.

As usual with non-convex optimization problems, convergence to the global minima is not guaranteed. Still, it is usually the case that the cost function has a rich set of local minima that provide satisfactory prediction accuracy.

Algorithm 1 below shows sequential learning:

---
Algorithm 1
Sequential learning
---

1: for j = 1 : M do
2:   Learn offline the parameters for the unknown components in mode j $$\beta_{j^*} = \underset{\beta_j}{\operatorname{argmin}} \sum_i \|y_{0:T}^{(i)} - \hat{y}_{0:T}^{(i)}\|^2$$

3: Estimate the error covariance matrix covariance matrix $$\Sigma_j \approx \frac{1}{N_j(T+1)} \sum_{i=1}^{N_j} \sum_{l=0}^{m} [y_l^{(i)} - \hat{y}_l^{(i)}][y_l^{(i)} - \hat{y}_l^{(i)}]'$$

4: Estimate the switching parameter $$\eta^* =$$
$$\underset{\eta}{\operatorname{argmin}} - \sum_i \sum_{j=1}^{M} q(\theta = j \mid y_{0:T}^{(i)}) \log p(\theta = j \mid y_{0:T}^{(i)}; \beta_{j^*}, \eta)$$

subject to:

$$p(\theta = j \mid y_{0:T}; \beta_j^*, \eta) = \frac{p(y_{0:T} \mid \theta = j; \beta_j^*)\eta_j}{\sum_{l=1}^{M} p(y_{0:T} \mid \theta = l; \beta_{l^*})\eta_l}$$

where $$p(y_{0:T} \mid \theta = j; \beta_j^*) \sim \mathcal{N}(\hat{y}_{0:T}, \Sigma_j),$$
$$\eta_j \geq 0, \sum_{j=1}^{M} \eta_j = 1,$$

---
Algorithm 1
Sequential learning
--- with $\eta = [\eta_1, \ldots, \eta_M]$, $\hat{y}_{0:T}$ the simulated outputs in mode j.
5: Predict online the mode $$j^* = \underset{j}{\operatorname{argmax}} p(\theta = j \mid y_{0:T}; \beta_j^*, \eta^*)$$

Algorithm 2 below shows joint learning

---
Algorithm 2
Joint learning
---

1: Solve offline the optimization problem $$\beta_j^*, \eta^* =$$
$$\underset{\beta_j, \eta}{\operatorname{argmin}} - \sum_i \sum_{j=1}^{M} q(\theta = j \mid y_{0:T}^{(i)}) \log p(\theta = j \mid y_{0:T}^{(i)}; \beta_j, \eta)$$

subject to:

$$\eta_j \geq 0, \sum_{j=1}^{M} \eta_j = 1,$$

$$p(\theta = j \mid y_{0:T}; \beta_j, \eta) = \frac{p(y_{0:T} \mid \theta = j; \beta_j)\eta_j}{\sum_{l=1}^{M} p(y_{0:T} \mid \theta = l; \beta_l)\eta_l}$$

where $$p(y_{0:T} \mid \theta = j; \beta_j) = \prod_{i=0}^{T} p(\hat{y}_i + v_i \mid \theta = j; \beta_j)$$

and $p(\hat{y}_i + v_i) \sim \mathcal{N}(\hat{y}_i, \Sigma_j)$, with $\hat{y}_{0:T}$ the simulated sequence of outputs in mode j, and $\Sigma_j$ the measurement noise covariance matrix.
2: Predict online the mode $$j^* = \underset{j}{\operatorname{argmax}} p(\theta = j \mid y_{0:T}; \beta_j^*, \eta^*)$$

4. ILLUSTRATIVE EXAMPLE

To showcase some approaches described herein, the following will develop a diagnosis engine for detecting and isolating faults in a rail switch system. Some approaches described herein consider a set of faults for which a hybrid classifier is built that uses partial system knowledge and a NN-based classifier for comparison purposes.

4.1. Rail Switch Model Description

Figure 4:
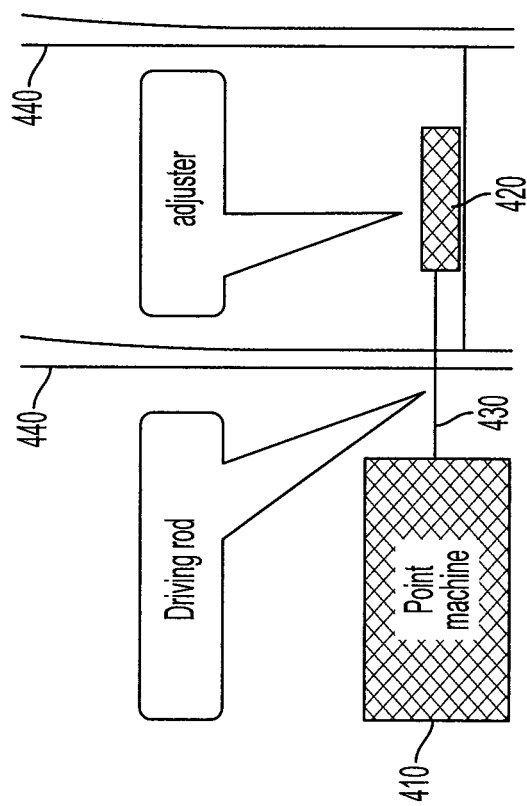
FIG. 4 illustrates a rail switch model example.

The rail switch is composed of a servo-motor and a gear mechanism for scaling the rotational motion and for amplifying the torque generated by the electrical motor. The rail load is composed of a mechanical adjuster, and tongue-rails. The schematics of the system is presented in FIG. 4, which depicts the main components of the rail switch. The point machine 410 is composed of two sub-components: servo-motor and gear mechanism. The electrical motor acts as a power source. The gear mechanism is responsible for scaling down the angular velocity generated by the servo-motor, amplifying the torque generated by the servo-motor and transforming the rotational motion into a translational motion. The rail load is composed of two main components:

the adjuster 420 and the tongue rails. The adjuster transfers the force generated by the motor (through the driving rod) to the rails. The adjuster 420 connects the driving rod 430 connected to the point machine 410 to the rails 440. There is a delay between the time instances the driving rod 430 and the adjuster 420 start moving. This delay is controlled by two bolts on the driving rod 430. Tighter bolt settings mean a smaller delay, while looser bolt settings produce a larger delay. The adjuster 420 is connected to the two rails 440 that are moved from left to right or right to left, depending on the traffic needs. The motion of the rail 440 is eased by a set of bearings and affected by the length of the rail 440 and elasticity of the rail 440. Based on the technical specifications of the servo-motor and adjuster 420, Modelica models were built for each of the servo-motor and adjuster 420. Building a first-principle model for the rail proved to be challenging and hence some embodiments learn a model for it from the measurement data.

The first step in learning a model for the rail is choosing a representation that is compatible with the rest of the model: it must have an interface (port or connector) compatible with the mechanical domain. The interface is characterized by two variables: a flow variable (force) and a non-flow variable (velocity). The product between the flow and non-flow variables has the interpretation of instantaneous power. Next, some embodiments select a set of constitutive equations that constraint the interface variables. Some embodiments opt to represent the map involving the interface variable as a NN. Since such a map has an input and output, the next step is determining which is which. Following the step described in section 2.2, some embodiments use the BLT representation to determine the input and the output of the NN. Note that any map (even a linear one) is sufficient to perform the BLT transform. It should not come as a surprise that the BLT transform indicates that the force is an output.

Hence, the rail behavior is modeled by using a causal map $F=g(u; w)$, where $g: \mathbb{R}^3 \to \mathbb{R}$ is a map described by a NN with one hidden layer $$g(u)=W^{[1]}(\tanh(W^{[0]}u+b^{[0]}))+b^{[1]} \quad (8)$$

where, the input $u=[x, \dot{x}, \ddot{x}]$ is a vector containing the position, speed and acceleration, the output F is the force, and $w=\{W^{[0]}, b^{[0]}, W^{[1]}, b^{[1]}\}$ is the set of parameters of the map g.

4.2. Fault Modes

Some embodiments consider four fault operating modes: left and right misaligned adjuster bolts, obstacle and missing bearings. These fault modes were reported to be of interest by a rail system operator that was collaborated with. There are many other fault modes of interest at the level of the point machine for example. Such faults are more readily detected due to the rich instrumentation present at the servo-motor. The following will describe some examples of fault modes.

Figure 5:
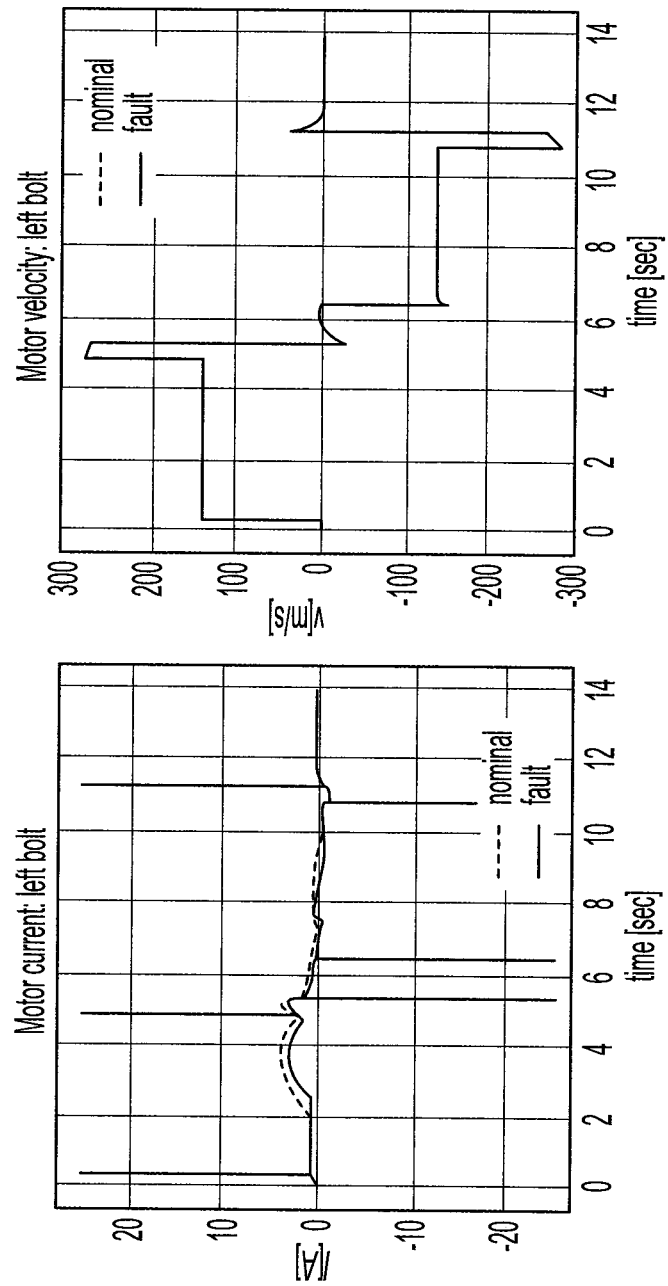
FIG. 5 illustrates the effects of a misaligned left adjuster bolt on the motor current and angular velocity.
Figure 6:
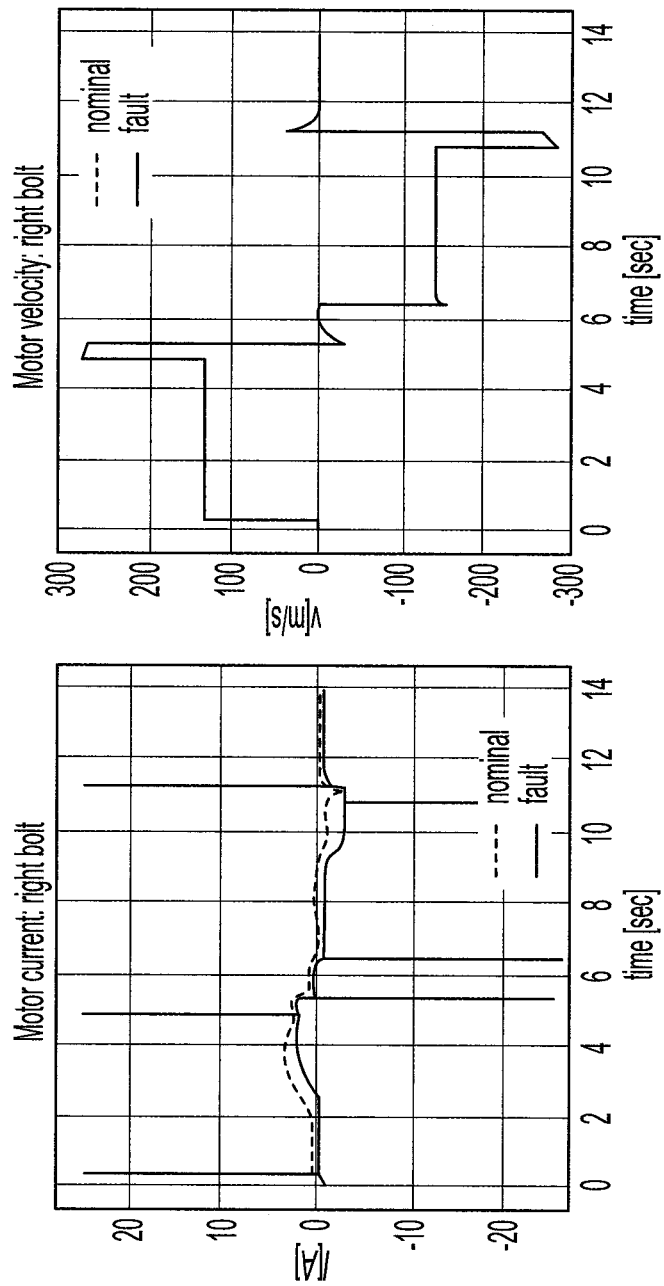
FIG. 6 illustrates the effects of a misaligned right adjuster bolt on the motor current and angular velocity.

Misaligned adjuster bolts: In this fault mode, the bolts of the adjuster deviate from their nominal position. As a result, the instant at which the drive rod meets the adjuster (and therefore the instant at which the switch rail starts moving) happens either earlier or later. For example, in a left-to-right motion, if the left bolt deviates to the right, the contact happens earlier. The reason is that since the distance between the two bolts decreases, the left bolt reaches the adjuster faster. As a result, when the drive rod reaches its final position, there may be a gap between the right switch blade and the right stock rail. In contrast, if the left bolt deviates to the left, the contact happens later. The model of the adjuster includes parameters that can set the positions of the bolts, and therefore the effects of this fault mode can be modeled without difficulty. FIG. 5 shows the effects of a misaligned left adjuster bolt on the motor current and angular velocity. FIG. 6 shows the effects of a misaligned right adjuster bolt on the motor current and angular velocity.

Figure 7:
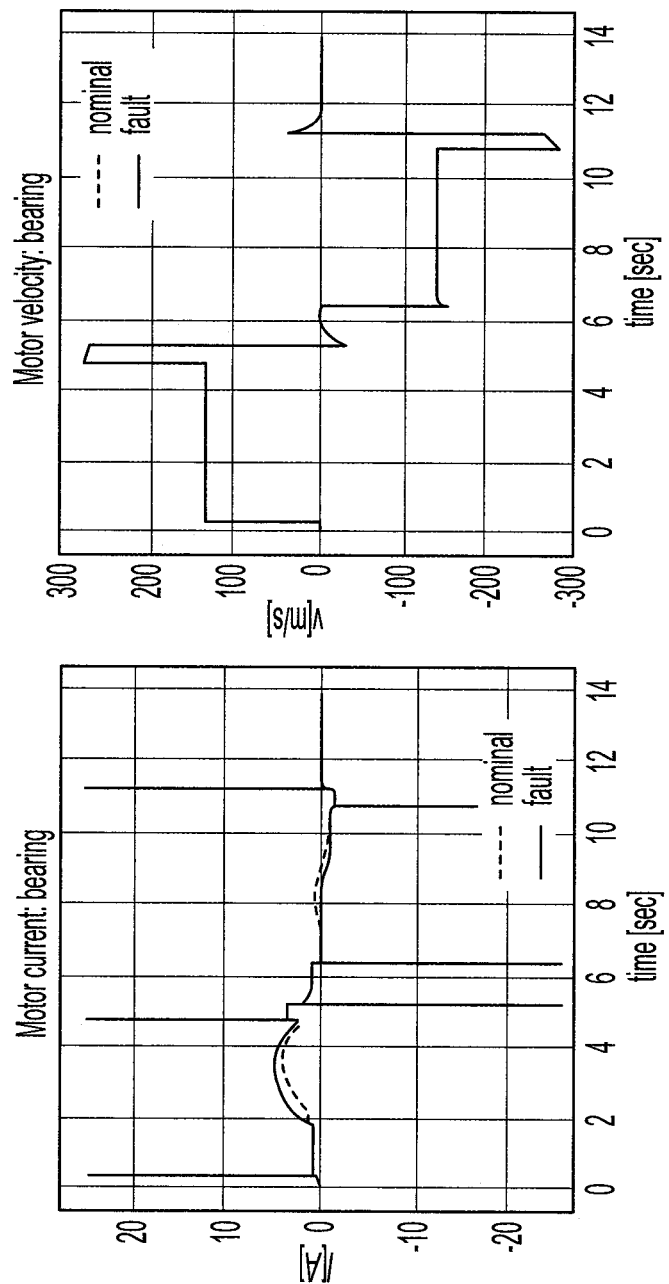
FIG. 7 illustrates the effects of missing bearings on the motor current and angular velocity.

Missing bearings: To minimize friction, the rails are supported by a set of rolling bearings. When they become stuck or lost, the energy losses due to friction increase. A component connected to the rail was included to account for friction. This component has a parameter that sets the value for the friction coefficient. By increasing the value of this parameter, the effect of the missing bearings fault can be simulated. FIG. 7 shows a comparison between the nominal behavior and the missing bearing behavior on the motor current and angular velocity. In this regard, FIG. 7 illustrates the effects of missing bearings on the motor current and angular velocity.

Obstacle: In this fault mode, an obstacle obstructs the motion of the switch blades. In case the obstacle is insurmountable, a gap between the switch blades and the stock rail appears. The effect on the motor torque is a sudden increase in value, as the motor tries to overcome the obstacle. To model this fault, a component was included that induces a localized, additional friction phenomenon for the switch blades. This component has two parameters: the severity of the fault and the position.

Figure 8:
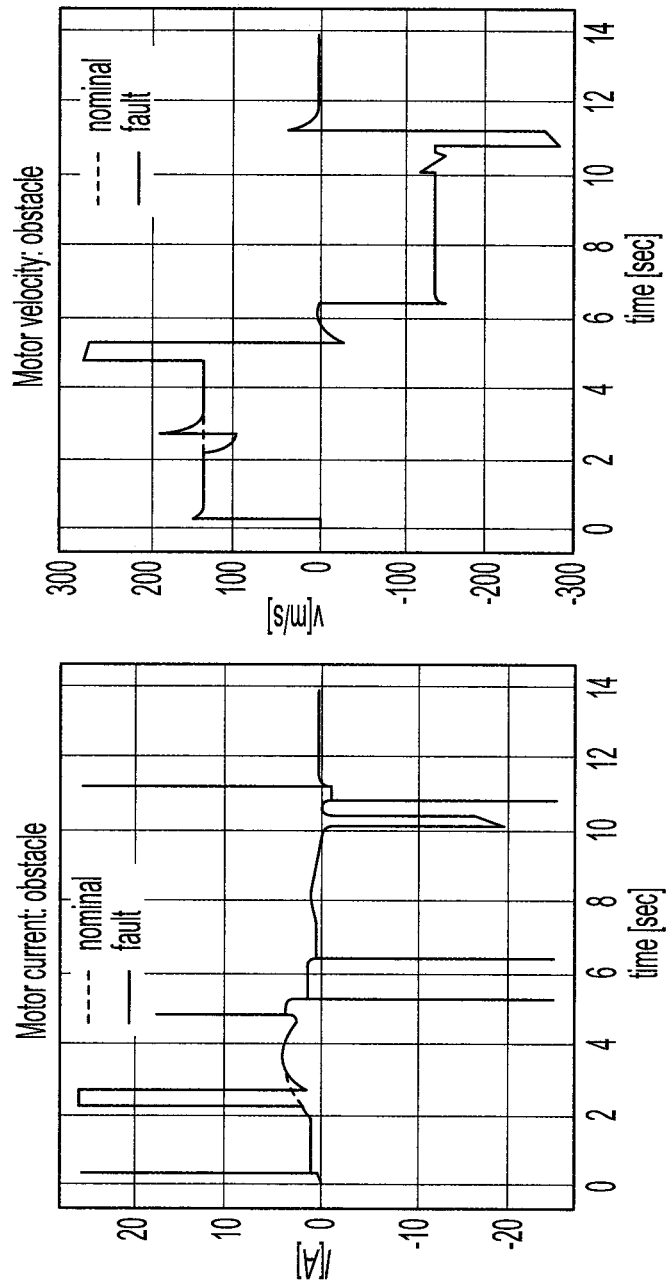
FIG. 8 illustrates the effects of missing bearings on the motor current and angular velocity.

For very high severity, the switch blades cannot move beyond a certain position. FIG. 8 shows a comparison between the nominal behavior and the obstacle present behavior on the motor current and angular velocity.

4.3. Fault-Diagnosis: Partially Known Behavior

First, some embodiments train the parameters of the rail model. Since the rail model is not directly impacted by the fault modes, these embodiments learn one single model that is valid for all modes. Some embodiments select the hidden layer dimension to be 20 for the NN modeling the rail. Hence, these embodiments have a total of 100 parameters. To our knowledge, currently no deep learning platform supports DAE in the loop for the training process. The DAETools (Nikolic, D. D. (2016b, April). Dae tools: equation-based object-oriented modelling, simulation and optimization software. *PeerJ Computer Science*, 2, e54) Python package does support DAE as dynamical models and enables gradient computations through sensitivity analysis. This requires, though, transforming the Modelica model into a form compatible with the DAETools formalism which is not a trivial process. Hence, some embodiments opt to use a gradient-free algorithm and use a functional mockup unit (FMU) (Blochwitz, T., Otter, M., Arnold, M., Bausch, C., Claub, C., Elmqvist, H., . . . Augustin, S. (2011). The functional mockup interface for tool independent exchange of simulation models. In *In proceedings of the 8th international modelica conference*) representation of the rail-switch model that was imported in Python and integrated in a least-square optimization process. In particular, some embodiments use Powell algorithm, which is the closest gradient-free optimization algorithm to a gradient-based one. The training data corresponds to the nominal rail behavior, and consists, in one example, of motor current, angle and angular velocity measurements. The inputs to the server motor are pre-designed reference signals that ensure a specific angular velocity profile for the rail. A seven second reference signal profile ensures the motion from left to right of the rail. A reversed reference profile ensures the rail motion from right to left. The output measurements are time series over 14 second, sampled at 0.05 second time period.

Since the fault scenario does not directly affect the rail, only nominal data is used to train the rail model parameters. Using the Powell algorithm, the following optimization problem is solved:

$$\min_{w^{[1]}, b^{[1]}, w^{[0]}, b^{[0]}} \frac{1}{N} \sum_{i=1}^{N} \|y(t_i) - \hat{y}(t_i)\|^2$$

subject to:

$$F(\dot{z}(t_i), z(t_i)) = 0$$

Where $F(\dot{z}, z) = 0$ is the DAE corresponding to the rail switch model that includes the rail representation shown in (8), and h(z) is the measurement model that selects the motor current, angle and angular velocity from the model variables. The variables $y(t_i)$ and $\hat{y}(t_i)$ are measured and simulated output measurements, respectively. The variances of the output prediction errors were estimated to be: 0.05, 0.74, and 0.57 for the motor current, angle and velocity, respectively.

Next, some embodiments train the parameters of the classifier as described in Algorithm 1. For each of the fault modes, some embodiments generated 1000 time series as training data. The fault data was generated by selecting some fault parameters and adding noise to the outputs. In particular, for the left bolt fault mode, a deviation from its nominal value of 50 mm was set, for the right bolt fault mode a 200 mm deviation was set from its nominal value, for the bearing fault mode the viscous coefficient was set at 5000 Ns/m, and an obstacle at 10 cm was set from the initial rail position, with a viscous coefficient equal to $10^5$ Ns/m affecting the rail motion. The noise free faulty behavior corresponded to the four fault modes are shown in FIGS. 5-8. The noise added to the outputs was chosen as zero mean Gaussian noise with variances determined by the trained model, as shown above.

Figure 9:
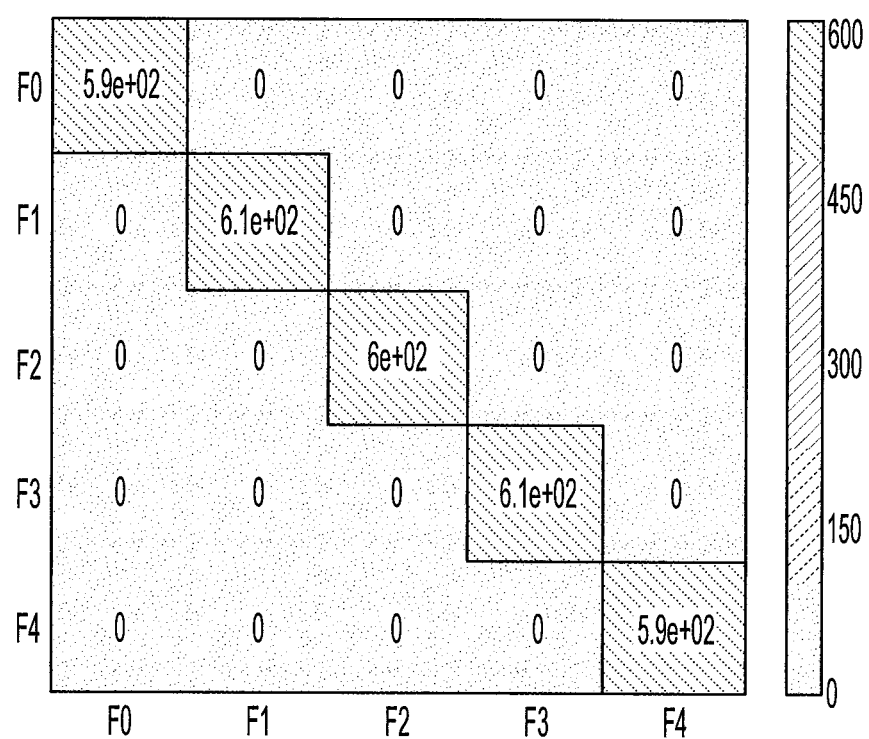
FIG. 9 illustrates an example confusion matrix: training data.
Figure 10:
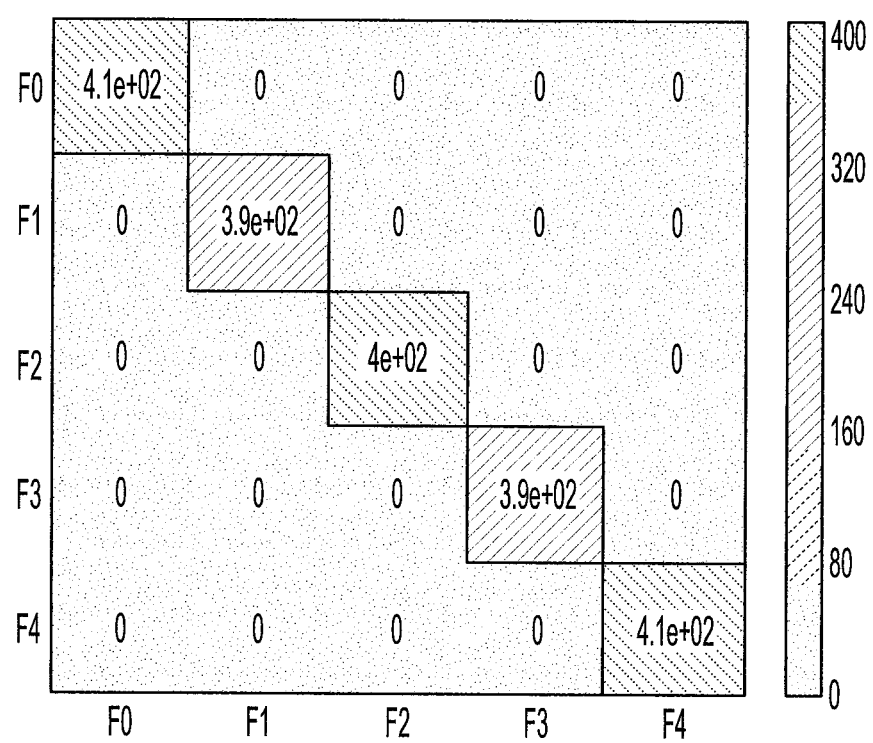
FIG. 10 illustrates an example confusion matrix: testing data.

Some embodiments split the data into training (60%) and test (40%) data. The probabilities $q(\theta = j | y_{0:T}^{(i)})$ follow from the time series labels: $q(\theta = j | y_{0:T}^{(i)})$ if the time series $y_{0:T}^{(i)}$ corresponds to mode j, and zero otherwise. To define the loss function, some embodiments calculate the probabilities $p(y_{0:T}^{(i)} | \theta = j)$ by approximating them using model simulations. Namely, for each mode j, some embodiments simulated the rail-switch model by activating the $j^{th}$ fault and generating the output time series $\hat{y}_{0:T}^{(j)}$. It follows that $$p(y_{0:T}^{(i)} | \theta = j) = \frac{1}{\sqrt{(2\pi)^3 |\Sigma|}} e^{-\frac{1}{2}(y_{0:T}^{(i)} - \hat{y}_{0:T}^{(j)})^T \Sigma^{-1} (y_{0:T}^{(i)} - \hat{y}_{0:T}^{(j)})}$$

where $\Sigma$ is a diagonal matrix with diagonal entries determined by the output noise variances, and $|\Sigma|$ being the determinant of $\Sigma$. Let $q_{ij} = q(\theta = j | y_{0:T}^{(i)})$ and $p_{ij} = p(\theta = j | y_{0:T}^{(i)})$. The final step is the compute the switch parameters $\eta_j$ that minimize the cross-entropy loss function:

$$\min_{\eta_j} \frac{1}{N} \sum_{i,j}^{N,5} q_{i,j} \log p_{ij},$$

where $$p_{ij} = \frac{\eta_j p(y_{0:T}^{(i)} | \theta = j)}{\left(\sum_{l=1}^{5} \eta_l p(y_{0:T}^{(i)} | \theta = l)\right)}$$

and N=3000. Some simulations used Autograd to compute the gradient of the loss function, and Adams algorithm to compute the optimal solution described in Table 1 below. The confusion matrices for the training and testing data are shown in FIGS. 9 and 10.

TABLE 1

Optimal solution for the hybrid diagnoses.

| Parameters | Values |
|---|---|
| $\eta_1$ | 0.00955831 |
| $\eta_2$ | 0.00994298 |
| $\eta_3$ | 0.34316536 |
| $\eta_4$ | 0.58860535 |
| $\eta_5$ | 0.06784462 |

4.4. Fault Diagnosis: Neural Network-Based Classifier

Some implementations trained a NN-based classifier using the same data set. In general, it is difficult to find the best and the most parsimonious NN architecture that generates good results. The implementations used a trial and error process to converge to a NN architecture that gives accurate results. Using the 14 second time series as input samples proved to be a bad idea. The 5000 samples were not enough for the tens of thousands of parameters of the NN. Recall that the number of columns of the first layer of the NN is given by the input size. Hence, the number of inputs had to be reduced. Instead of using an autoencoder which is typically greedy for data, some implementations trained a random forest classifier and used its feature importance output to select 27 entries of the time series that contain relevant information for differentiating between the fault modes. Again, a trial and error process was employed to converge to the minimal number of features and a parsimonious NN architecture that is able to learn an accurate classifier. Some implementations ended up with a NN with one hidden layer of size 15 and with an output layer of size 5 that uses a softmax function as an activation function. Hence, there is a total number of 500 training parameters. Although it is not guaranteed that there is no simpler NN architecture, empirically the inventors have noticed that the prediction accuracy decreases for hidden layer sizes smaller than 15. After training the NN parameter, some implementations ended up with a classifier that has similar accuracy performance as the one shown in the previous section.

4.5. Discussion

When including the partial model, the complexity of the classification is transferred from learning a potentially complex classifier to training a regression model for the missing component. Hence, there is potential to reduce complexity. The classification problem for the partial model knowledge case is much simpler and hence more easily to train. In addition, the systems described herein escape the feature selection step that is typically an ad-hoc process. In addition, since some embodiments maintain the physical interpretation of the model (at least in part), there are opportunities to further investigate the consequences of faults to other system components as faults progress. That is, some embodiments can use the model for prognostics. Machine learning algorithms for prognostics are hungry for data; data that in many cases is not available. The partial model has a regularization effect on the learning algorithm, and hence it is an avenue for dealing with small data sets and limiting this way the overfitting. The classification results for both the hybrid and machine learning architecture were perfect. This is most likely due to the use of simulated data for the fault modes.

Still, the approaches described herein give reasonable results on experimental data as well, using a complexity reduced classifier.

5. CONCLUSIONS

The above discussed the classification problem based on data generated by a partially known physical system. Unlike standard classification problems, where the classifier ignores any knowledge about the physical system, one goal was to integrate this information in the classifier design. The above discussion demonstrated that the classification problems can be converted into a set of regression problems and a set of dimensionally reduced classification sub-problems. Two algorithms were introduced for learning a classifier, each one corresponding to an assumption on the measurement noise. The approach was showcased in the context of fault diagnosis for a rail switch system.

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth. It will be further appreciated that the techniques disclosed herein may be embodied by one or more processors.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A device comprising:
at least one processor; and
at least one memory including computer program code;
the at least one memory and the computer program code configured to, with the at least one processor, cause the device to:
perform a classification-based diagnosis for at least one of detecting and predicting faults in a physical system using partial system model information, said partial system model information including at least one of a system topology and component behavior, wherein said classification-based diagnosis includes:
during an offline learning phase, learning parameters of an unknown component of the physical system, wherein the at least one memory and the computer program code are further configured to, with the at least one processor, cause the device at least to:
learn the parameters of the unknown component by solving:

$$\beta_{j^*} = \underset{\beta_j}{\operatorname{argmin}} \sum_i \left\| y_{0:T}^{(i)} - \hat{y}_{0:T}^{(i)} \right\|^2$$

where $\beta$ is the parameters, j is a possible mode, and $y_{0:T}$ is an output of a system that includes the unknown component; and during an online learning phase, predicting a current mode based on the learned parameters of the unknown component.

2. The device of claim 1, wherein the at least one memory and the computer program code are further configured to, with the at least one processor, cause the device at least to:
learn the parameters of the unknown component by solving an optimization problem.

3. The device of claim 1, wherein the at least one memory and the computer program code are further configured to, with the at least one processor, cause the device at least to:
during the offline learning phase, estimate a switching parameter; and
during the online learning phase, predict the current mode further based on the switching parameter.

4. The device of claim 1, wherein the at least one memory and the computer program code are further configured to, with the at least one processor, cause the device at least to:
during the offline learning phase:
estimate an error covariance matrix; and
estimate a switching parameter based on an argmin function and the estimated covariance matrix; and
during the online learning phase, predict the current mode further based on the switching parameter.

5. The device of claim 1, wherein the at least one memory and the computer program code are further configured to, with the at least one processor, cause the device at least to:
during the online learning phase, predict the current mode according to an argmax function, wherein an input of the argmax function is the learned parameters.

6. The device of claim 1, wherein the at least one memory and the computer program code are further configured to, with the at least one processor, cause the device at least to:
during the online learning phase, predict the current mode by solving:

$$j^* = \underset{j}{\operatorname{argmax}} p(\theta = j \mid y_{0:T}; \beta_j^*, \eta^*)$$

where $\beta$ is the parameters, j is a possible mode, $\theta$ is a random variable, $\eta$ is a switching parameter, and $y_{0:T}$ is an output of a system that includes the unknown component.

7. A method comprising:
performing a classification-based diagnosis for at least one of detecting and predicting faults in a physical system using partial system model information, said partial system model information including at least one of a system topology and component behavior, wherein said classification-based diagnosis includes:
during an offline learning phase, learning parameters of an unknown component, wherein the learning of the parameters of the unknown component occurs by solving:

$$\beta_{j^*} = \underset{\beta_j}{\operatorname{argmin}} \sum_i \left\| y_{0:T}^{(i)} - \hat{y}_{0:T}^{(i)} \right\|^2$$

where $\beta$ is the parameters, j is a possible mode, and $y_{0:T}$ is an output of a system that includes the unknown component; and
during an online learning phase, predicting a current mode based on the learned parameters of the unknown component.

8. The method of claim 7, wherein the learning of the parameters of the unknown component occurs by solving an optimization problem.

9. The method of claim 7, further comprising:
during the offline learning phase, estimate a switching parameter; and
during the online learning phase, predict the current mode further based on the switching parameter.

10. The method of claim 7, further comprising:
during the offline learning phase:
estimate an error covariance matrix; and
estimate a switching parameter based on an argmin function and the estimated covariance matrix; and
during the online learning phase, predict the current mode further based on the switching parameter.

11. The method of claim 7, further comprising:
during the online learning phase, predict the current mode according to an argmax function, wherein an input of the argmax function is the learned parameters.

12. A device comprising:
at least one processor; and
at least one memory including computer program code;
the at least one memory and the computer program code configured to, with the at least one processor, cause the device to:
perform a classification-based diagnosis for at least one of detecting and predicting faults in a physical system using partial system model information, said partial system model information including at least one of a system topology and component behavior, wherein said classification-based diagnosis includes:
during an offline learning phase, learning parameters of an unknown component of the physical system; and
during an online learning phase, predicting a current mode based on the learned parameters of the unknown component, wherein the at least one memory and the computer program code are further configured to, with the at least one processor, cause the device at least to:
during the online learning phase, predict the current mode by solving:

$$j^* = \operatorname*{argmax}_{j} p(\theta = j | y_{0:T}; \beta_j^*, \eta^*)$$

where $\beta$ is the parameters, j is a possible mode, $\theta$ is a random variable, $\eta$ is a switching parameter, and $y_{0:T}$ is an output of a system that includes the unknown component.

13. The device of claim 12, wherein the at least one memory and the computer program code are further configured to, with the at least one processor, cause the device at least to:
learn the parameters of the unknown component by solving an optimization problem.

14. The device of claim 12, wherein the at least one memory and the computer program code are further configured to, with the at least one processor, cause the device at least to:
learn the parameters of the unknown component by solving:

$$\beta_{j^*} = \operatorname*{argmin}_{\beta_j} \sum_i \left\| y_{0:T}^{(i)} - \hat{y}_{0:T}^{(i)} \right\|^2$$

where $\beta$ is the parameters, j is a possible mode, and $y_{0:T}$ is an output of a system that includes the unknown component.

15. The device of claim 12, wherein the at least one memory and the computer program code are further configured to, with the at least one processor, cause the device at least to:
during the offline learning phase, estimate a switching parameter; and
during the online learning phase, predict the current mode further based on the switching parameter.

16. The device of claim 12, wherein the at least one memory and the computer program code are further configured to, with the at least one processor, cause the device at least to:
during the offline learning phase:
estimate an error covariance matrix; and
estimate a switching parameter based on an argmin function and the estimated covariance matrix; and
during the online learning phase, predict the current mode further based on the switching parameter.

17. The device of claim 12, wherein the at least one memory and the computer program code are further configured to, with the at least one processor, cause the device at least to:
during the online learning phase, predict the current mode according to an argmax function, wherein an input of the argmax function is the learned parameters.

* * * * *